(12) United States Patent
van Allen et al.

(10) Patent No.: US 7,177,954 B1
(45) Date of Patent: *Feb. 13, 2007

(54) INTERFACE SYSTEM USING HOTSPOTS

(75) Inventors: Philip A. van Allen, Santa Monica, CA (US); J. Edward Carryer, Stanford, CA (US)

(73) Assignee: Vulcan Patents LLC, Seattle, WA (US)

( * ) Notice: Subject to any disclaimer, the term of this patent is extended or adjusted under 35 U.S.C. 154(b) by 230 days.

This patent is subject to a terminal disclaimer.

(21) Appl. No.: 10/177,737

(22) Filed: Jun. 20, 2002

Related U.S. Application Data

(63) Continuation of application No. 09/015,577, filed on Jan. 29, 1998, now Pat. No. 6,411,994.

(60) Provisional application No. 60/061,310, filed on Oct. 7, 1997.

(51) Int. Cl.
G06F 15/16 (2006.01)

(52) U.S. Cl. .................. 709/250; 709/246; 235/70

(58) Field of Classification Search ........ 709/217–219; 235/472.01
See application file for complete search history.

(56) References Cited

U.S. PATENT DOCUMENTS

| | | | |
|---|---|---|---|
| 3,891,829 A | 6/1975 | Bobras | 235/462.04 |
| 3,894,756 A | 7/1975 | Ward | 283/86 |
| 4,597,495 A | 7/1986 | Knosby | 209/3.3 |
| 4,728,784 A | 3/1988 | Stewart | 235/462.07 |
| 4,998,010 A | 3/1991 | Gordon et al. | 235/494 |
| 5,047,614 A | 9/1991 | Bianco | 235/385 |
| 5,298,731 A | 3/1994 | Ett | 235/462.02 |
| 5,337,358 A | 8/1994 | Axelrod et al. | 235/379 |
| 5,382,784 A | 1/1995 | Eberhardt | 235/472 |
| 5,525,798 A | 6/1996 | Berson et al. | 235/468 |
| 5,537,336 A | 7/1996 | Joyce | 702/108 |
| 5,545,883 A | 8/1996 | Sasou et al. | 235/449 |
| 5,572,643 A | 11/1996 | Judson | 709/218 |
| 5,600,115 A | 2/1997 | Balzano | 235/382 |
| 5,604,516 A | 2/1997 | Herrod et al. | 345/168 |
| 5,640,193 A | 6/1997 | Wellner | 709/218 |
| 5,684,885 A | 11/1997 | Cass et al. | 235/469 |
| 5,693,693 A | 12/1997 | Auslander et al. | 524/88 |

(Continued)

FOREIGN PATENT DOCUMENTS

JP 07093567 A 4/1995

(Continued)

OTHER PUBLICATIONS

Unknown author, Portable Self-Checkout Retail System:, IBM Technical Disclosure Bulletin, p. 315-318, vol. 35, No. 1A, Jun. 1992.

(Continued)

*Primary Examiner*—Patrice Winder
(74) *Attorney, Agent, or Firm*—Perkins Coie LLP

(57) ABSTRACT

A system and method for providing interaction between a user and a computer system is disclosed. A computer system has a sensor configured to read and interpret a content hotspot and to read and interpret a context hotspot, and a processor configured to perform an operation that is based on content information interpreted from the content hotspot. The operation is influenced by context information interpreted from the context hotspot.

20 Claims, 7 Drawing Sheets

U.S. PATENT DOCUMENTS

| | | | |
|---|---|---|---|
| 5,729,251 A | 3/1998 | Nakashima | 709/250 |
| 5,739,814 A | 4/1998 | Ohara et al. | 345/173 |
| 5,804,803 A | 9/1998 | Cragun et al. | 707/1 |
| 5,832,119 A | 11/1998 | Rhoads | 382/232 |
| 5,841,978 A | 11/1998 | Rhoads | 709/217 |
| 5,848,413 A | 12/1998 | Wolff | 707/10 |
| 5,862,321 A | 1/1999 | Lamming et al. | 707/500 |
| 5,862,429 A | 1/1999 | Ueno et al. | 399/13 |
| 5,869,819 A | 2/1999 | Knowles et al. | 235/375 |
| 5,886,337 A | 3/1999 | Rockstein et al. | 235/472.01 |
| 5,903,729 A | 5/1999 | Reber et al. | 709/219 |
| 5,905,248 A | 5/1999 | Russell et al. | 235/462 |
| 5,905,251 A * | 5/1999 | Knowles | 235/472.01 |
| 5,938,727 A | 8/1999 | Ikeda | 709/218 |
| 5,978,773 A * | 11/1999 | Hudetz et al. | 709/219 |
| 6,012,102 A | 1/2000 | Shachar | 709/247 |
| 6,076,734 A | 6/2000 | Dougherty et al. | 235/462.01 |
| 6,098,882 A | 8/2000 | Antognini et al. | 235/454 |
| 6,108,656 A | 8/2000 | Durst et al. | 707/10 |
| 6,138,151 A * | 10/2000 | Reber et al. | 709/219 |
| 6,148,331 A | 11/2000 | Parry | 709/218 |
| 6,202,060 B1 * | 3/2001 | Tran | 707/3 |

FOREIGN PATENT DOCUMENTS

| | | |
|---|---|---|
| JP | 10171758 | 6/1998 |
| WO | 97/01137 | 6/1997 |
| WO | 97/32262 | 9/1997 |
| WO | 98/03923 A1 | 1/1998 |

OTHER PUBLICATIONS

Harris, Stuart, et al, Netscape Quick Tour for Macintosh: Accessing & Navigating the Internet's World Wide Web, p. 60, 1995. Gorbet, Matthew G., et al "Triangles" Tangible Interface for Manipulation and Exploration of Digital Information Topography, Nov. 1, 1998, Triangles CHI98, pp. 1-2.

Bar Code Hotel, Nov. 1, 1998, author unknown, http://www.hoberman.com/poerry/php/bch/index.html., pp. 1-5. Ishii, Hiroshi et al, "Tangible Bits: Towards Seamless Interfaces between People, Bits and Atoms", Mar. 22-27, 1997, CHI. pp. 234-241.

Gorbet, Matthew G., et al, "Triangles: Tangible Interface for Manipulation and Exploration of Digital Information Topography", Apr. 18-23, 1998, CHI98, pp. 49-56.

Poyner, Rich, "The Hand that Rocks the Cradle", May Jun. 1995, I.D., pp. 60-65.

* cited by examiner

US 7,177,954 B1

INTERFACE SYSTEM USING HOTSPOTS

CROSS-REFERENCE TO RELATED APPLICATION

This is a Continuation of application Ser. No. 09/015,577, filed Jan. 29, 1998, which is hereby incorporated by reference, which claims benefit of Provisional U.S. Application No. 60/061,310, now U.S. Pat. No. 6,411,994 filed Oct. 7, 1997 which is also hereby incorporated by reference

BACKGROUND OF THE INVENTION

This invention relates generally to computer interfaces. More specifically, the present invention discloses a variety of computer interfaces that provide content by way of indirection. Preferred embodiments use encoded physical mediums including at least one region having an indirection encoded therein. The present invention also teaches datalinked physical mediums that provide users intuitive access to multimedia information that may be stored remotely.

People are constantly interacting with computerized systems, from the trivial (e.g., the computerized toaster or the remote control television) to the exceedingly complex (e.g., telecommunications systems and the Internet). An advantage of computerization is that such systems provide flexibility and power to their users. However, the price that must be paid for this power and flexibility is, typically, an increase in the difficulty of the human/machine interface.

A fundamental reason for this problem is that computers operate on principles based on the abstract concepts of mathematics and logic, while humans tend to think in a more spatial manner. Often people are more comfortable with physical, three-dimensional objects than they are with the abstractions of the computer world. In short, the power and flexibility provided by the computer and related electronic technology are inherently limited by the ability of the human user to control these devices. Since people do not think like computers, metaphors are adopted to permit people to effectively communicate with computers. In general, better metaphors permit more efficient and medium independent communications between people and computers. The better metaphor will provide the user a natural and intuitive interface with the computer without sacrificing the computer's potential.

There are, of course, a number of computer interfaces which allow users, with varying degrees of comfort and ease, to interact with computers. For example, keyboards, computer mice, joysticks, etc. allow users to physically manipulate a three-dimensional object to create an input into a computer system. However, these computer interfaces are quite artificial in nature, and tend to require a substantial investment in training to be used efficiently.

Progress has been made in improving the computer interface with the graphical user interface (GUI). With a GUI, icons that represent physical objects are displayed on a computer screen. For example, a document file may look like a page of a document, a directory file might look like a file folder, and an icon of a trash can may be used for disposing of documents and files. In other words, GUIs use "metaphors" where a graphical icon represents a physical object familiar to users. This makes GUIs easier for most people to use. GUIs were pioneered at such places as Xerox PARC of Palo Alto, Calif. and Apple Computer, Inc. of Cupertino, Calif. The GUI is also often commonly used with UNIX™ based systems, and is rapidly becoming a standard in the PC/MS-DOS world with the Windows™ operating system provided by Microsoft Corporation of Redmond, Wash.

While GUIs are a major advance in computer interfaces, they nonetheless present a user with a learning curve due to their still limited metaphor. In other words, an icon can only represent a physical object; it is not itself a physical object. It would be ideal if the computer interface was embodied in a physical medium which could convey a familiar meaning, one perhaps relevant to the task at hand. While progress has been made towards achieving such a goal, many roadblocks yet remain. For example, assuming that for a given application one has selected a physical medium for use as a computer interface, the information necessary to support the computer interface must still be encoded within the physical medium. Additionally, techniques must be developed for linking such interfaces with the vast wealth of information available from remote sources using computer networks like the Internet.

Redford et al.'s U.S. Pat. No. 5,634,265, entitled "PRINTED PUBLICATION REMOTE CONTROL FOR ACCESSING INTERACTIVE MEDIA," filed Jul. 1, 1994, describes one rudimentary mechanism for encoding information within a physical medium. Redford describes the use of a printed publication such as a book being constructed to include a storage media, a data button, and remote control circuitry. The button is physically attached to the printed publication and when activated by a user, data from the storage media can initiate local feedback at the printed publication and the remote control can transmit a control message to a remote computer system which in turn performs some desired operation.

While strides have been made in attempting to improve computer interfaces, there is still progress to be made in this field. Ultimately, the interface itself should disappear from the conscious thought of users so that they can intuitively accomplish their goals without concern to the mechanics of the interface or the underlying operation of the computerized system.

SUMMARY OF THE INVENTION

One embodiment of the present invention teaches an interface system for providing content to a user via a computer network. The interface system has a routing server that maintains a database storing information regarding content addresses and content identification numbers (IDs). Each particular content address directs to content accessible over the computer network. The routing server responds to the receipt of a content ID (which is essentially a request for content) by redirecting the request to a given content address corresponding to the given content ID. Additionally, the routing server may log information regarding the content request on a service access log maintained on a computer readable medium.

In related embodiments, the interface system provides the user an encoded physical medium and a sensor. The encoded physical medium includes an indirection hotspot having a content ID encoded therein. The sensor is operable to decode the content ID and then transmit the decoded content ID to a network device. In turn, the network device transmits the decoded content ID over the computer network to the routing server.

In other related embodiments, the interface system also has a content server coupled with the routing server via the computer network. The content server stores the desired content identified by an entry in the database. It is contemplated that the content server can provide content directly to the network device. Alternatively, the content server can provide the content to the routing server which can log the transaction and then forward the content to the network device.

A separate embodiment of the present invention teaches another interface system for providing content to a user. This interface system includes a computer system having a computer readable medium, an encoded physical medium, and a sensor. The encoded physical medium includes an indirection hotspot having an indirection encoded therein. The indirection designates a storage location on the computer readable medium and the storage location provides a computer instruction initiating the provision of content to the user. The sensor is operable both to decode the indirection encoded in the indirection hotspot and to transmit the decoded indirection to the computer system.

In related embodiments, the storage location on the computer readable medium provides an address to a computer document such as a word processing document, an audio file, a video file, or a graphics file. In these cases when the user engages the sensor with the indirection hotspot, the computer responds by invoking an application suitable for accessing the computer document.

One aspect of the present invention teaches a method for providing a user content over a computer network such as the Internet. The method requires the steps of receiving at a routing web server a uniform resource locator (URL) identification number (ID) transmitted over the computer network by a web device, determining at the routing web server the URL that corresponds to the URL ID, redirecting the request for content to a content web server identified by the URL, and then providing the web device with the requested content.

A related method involves several steps for generating the URL ID prior to transmission to the routing web server. These include measuring and decoding a hotspot present on an encoded physical medium (the hotspot has the URL ID encoded therein), transmitting the URL ID to the web device, and transmitting the URL ID from the web device to the routing web server over the computer network. Other possible steps include providing content to the web device either directly or through the routing web server, logging each request for content at the routing web server, and logging each occurrence of content being routed through the routing web server.

The present invention therefore provides a more intuitive and richer metaphor for the interaction between humans and computerized systems, yet alleviates some of the encoding scheme demands placed upon the computer interface. These and other advantages of the present invention will become apparent upon reading the following detailed descriptions and studying the various figures of the drawings.

DETAILED DESCRIPTION OF THE PREFERRED EMBODIMENTS

Figure 1:
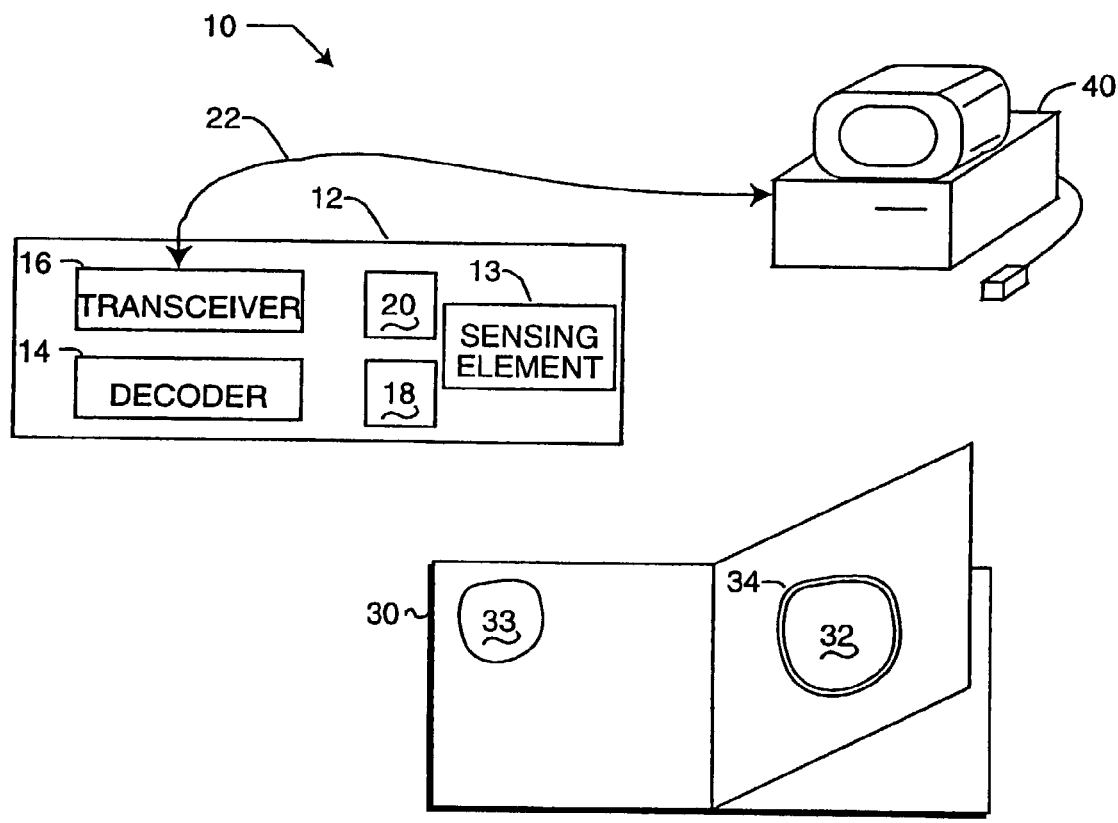
FIG. 1 is a diagrammatic illustration of a computer interface in accordance with one embodiment of the present invention.

With reference to FIG. 1, a computer interface 10 in accordance with one embodiment of the present invention will now be described. The interface 10 includes a sensor 12 and an encoded physical medium 30. As will be apparent, the computer interface 10 provides an intuitive mechanism for a user to interface with and control an electronic device such as a computer system 40 (also illustrated in FIG. 1).

The encoded physical medium 30 has at least one region 32 wherein information has been encoded. The content of the region 32 may be encoded according to a well known content encoding scheme such as a bar code scheme. The present invention also teaches a variety of new encoding schemes. For example, a content encoding scheme contemplated by the present invention is a bar code printed using invisible, e.g. infrared (1R), inks. Such a bar code would be apparent to the sensor but invisible to the user. Alternatively, the content of the region 32 may be encoded according to a spectral encoding scheme. One specific example of a suitable spectral encoding scheme is described below with reference to FIGS. 4-6. The encoded physical medium 30 may also include a document identification (ID) hotspot 33, similar to the region 32. The content encoded within the document ID, hotspot 33 will, however, be special in that it provides an indication of the identity of the particular encoded physical medium 30.

In certain embodiments, encoded regions such as the region 32 further include a marker 34 indicating that certain encoded information is present in the region 32. By way of example, in one spectral encoding scheme, the desired content for the region 32 is represented according to different visible and infrared inks (reflective and/or photoluminescent) applied to the region 32. The marker 34 is represented by yet another infrared ink similarly applied to the region 34. In this example, the user would not see the marker 34, but may or may not see a visual representation of the content encoded in the region 32. Throughout the specification, markers, hotspots, regions, inks, etc., are often described as being able to generate light. Being able to "generate light" is defined herein as including at least one of the ability to reflect or emit light.

The encoded physical medium 30 may take any suitable form. By way of example, the encoded physical medium 30 may be a page from a physical book or magazine, an article of clothing such as a T-shirt, a globe, consumer product packaging, etc. Such encoded physical mediums may have been marked and encoded with data for the specific purpose of providing the interface of the present invention. Alternatively, the encoded physical medium 30 may simply be items selected from a user's surroundings, the encoded information arising randomly or unintentionally (at least with relation to the user's application). In another embodiment, the encoded content arises randomly or unintentionally, but a marker 34 is applied intentionally. Some representative examples of encoded physical mediums are described below with reference to FIGS. 7–8.

The sensor 12 includes a sensing element 13, a decoder 14, a transceiver 16, an on/off switch 18, and memory 20. The sensing element 13 is arranged to measure information present on the encoded physical medium 30. When the utilized encoding scheme implements a marker 34, the decoder 14 is arranged to determine whether the marker 34 is present in measured information, and when the marker 34 is sensed, to decode the measured information. The transceiver 16 is operable to transmit data such as decoded information to the computer system 40. Depending upon the embodiment, the transceiver 16 may establish either a unidirectional or bi-directional communications link 22 between the interface 10 and the computer system 40. The communications link 22 is preferably a wireless communications link such as one based upon infrared (1R), radio-frequency (RF), or ultrasonic communications technology. However, the communications link 22 may take the form of a wired communications link such as a serial RS-232 or RS-485 data cable, or a parallel data cable.

In some embodiments, the sensor 12 operates by measuring information selected from the encoded physical medium 30 by the user, decoding as necessary, and then transmitting the decoded information to the computer system 40 for further processing. In other embodiments, the sensor 12 includes further hardware for processing the measured information locally. For example, the sensor 12 may include a microcontroller such as a PIC microcontroller programmed to process the measured information. The decoder 14 may be part of the microcontroller, or may be separate circuitry. In some embodiments, the sensor 12 maintains in the memory 20 a database related to the measured information. The information stored in the database may be used locally at the sensor and/or saved for subsequent transmission.

The computer system 40 appears in FIG. 1 as a personal desktop computer. However, it is contemplated that the interface 10 is suitable for use with a wide scope of electronic devices. The wide scope of suitable computer systems encompasses all types of personal computers, interactive TV systems, set-top boxes, web interfaces, haptic interfaces, streaming music and video sources, and many others. One particular example is a WebTV "net-top box." Further, although the interface 10 is intended to be representative of and thus generic to a broad range of interfaces contemplated by the present invention, it will be appreciated that computer interfaces of the present invention may take many forms which go beyond the example interface 10 of FIG. 1.

Figure 2:
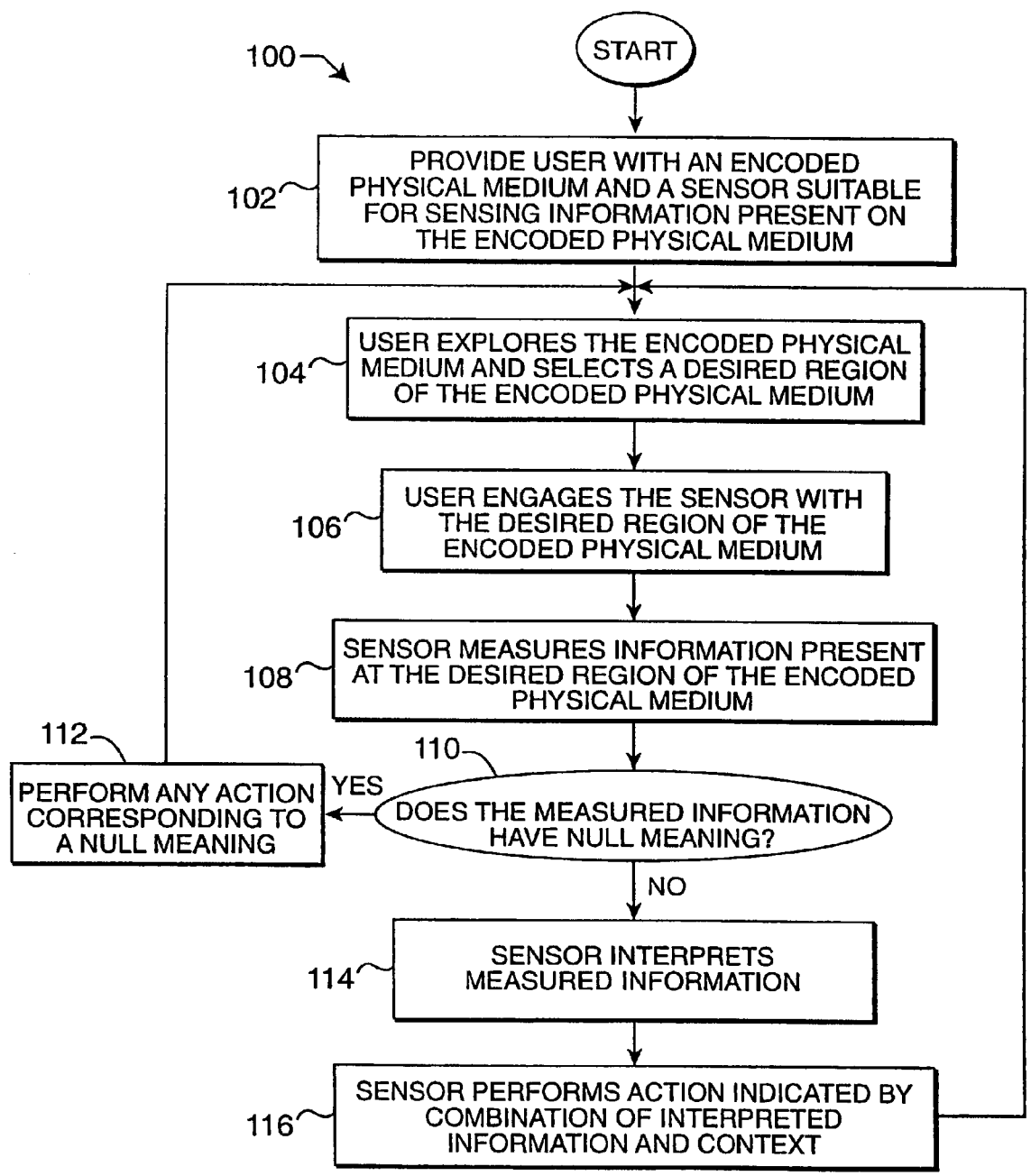
FIG. 2 is a flow chart illustrating one method for providing an interface between a user and a computer system in accordance with one aspect of the present invention.

With reference to FIG. 2, a method 100 for providing an interface between a user and a computer system in accordance with one aspect of the present invention will now be described. An initial step 102 provides the user with an encoded physical medium 30 and a sensor 12 suitable for sensing information present within the encoded physical medium 30. As described above, the encoded physical medium 30 may take any suitable form. One suitable method for performing the step 102 is described in more detail below with reference to FIG. 3.

In a next step 104, the user explores the encoded physical medium 30 and selects a desired portion 32 of the encoded physical medium 30. The user may be drawn into the desired portion 32 through text, coloring, or graphics illustrated on the desired portion 32. The text, coloring or graphics illustrated on the desired portion 32 may represent the encoded information, may be in addition to the encoded information, or may be some suitable combination of illustration and encoded information. Instead of being drawn in, perhaps in the case of a game or work task, the user may be selecting the desired portion 32 based upon some predefined criteria. For example, the user may be searching for a clue to a puzzle game, or simply doing inventory and selecting a bar code found on a product during this process. In any event, once the user has selected the desired portion 32 in step 104, in a step 106 the user engages the sensor 12 with the desired portion 32 of the encoded physical medium 30. The sensor engagement of step 106 will typically involve the user setting the sensor 12 to an ON state that indicates that the sensor 12 should be in operation. In the case of the interface 10 of FIG. 1, the step 106 would involve operation of the on/off switch 18. Depending upon the particular sensor and the application, sensor engagement may require the user to bring the sensor 12 into close proximity to or in contact with the desired region 32.

In a next step 108, the sensor 12 measures information present within the desired region 32 of the encoded physical medium 30. Information is defined herein as any data that the sensor 12 is capable of measuring. Thus, the information measured by the sensor 12 is not limited to information that has been purposefully encoded into the desired region 32 of the encoded physical medium 30.

A step 110 then determines whether the measured information has null meaning. When step 110 determines that the measured information has null meaning, it is simply determining that the measured information has not been marked, for the present purposes, as containing encoded information. However, as will be appreciated, a determination of null meaning may be consequential. Accordingly, when step 110 determines that the measured information has null meaning, a step 112 performs any action indicated by such a determination. For example, the sensor 12 may be equipped with a light that blinks or a buzzer that sounds when the measured information has null meaning. As another example, the sensor 12 may have memory 20 that is utilized to keep track of the meaning of the different measured regions, including each null determination. Alternatively, the null information may be transmitted to the computer system 40. In any event, once step 112 is complete, the control of the method 100 is passed back to step 104 allowing the user to explore further and select another region 32 for sensing.

When it is determined in step 110 that the information measured in step 108 does not have null meaning (e.g., the measured information has been marked as containing encoded information), control is passed to a step 114 wherein the sensor 12 interprets the measured information. Depending upon the specific application, step 114 may involve just decoding of the information from the particular encoding scheme into a data format suitable for transmission by the transceiver 16. However, in some embodiments significant processing of the measured information will occur locally at the sensor 12. Thus in a next step 116, the sensor 12 performs an operation that is a function of both the information interpreted in the step 114 and the context in which the information was measured. Note that context depends upon the particular application and may include the nature of previously interpreted information, the timing of the user's engagement of the sensor 12, information received at the sensor from the computer system 40, etc.

For example, with each new engagement of the sensor 12, the sensor 12 may store the interpreted information in a database in the memory 20 and then evaluate the database or a portion of it to determine whether a predefined condition has been satisfied. A predefined condition could be the user gathering a set number of clues or data points, at which point the sensor transmits all or some of the stored information to the computer system 40. In one specific example, the user may be perusing an encoded catalog magazine 30 with a hand-held wand sensor 12. As the user engages the wand sensor 12 with regions of the catalog 30 representing desired products, these regions are sensed and the information therein interpreted by the wand sensor 12. When finished, the user may select an order region 32 indicating to the sensor that the user is ready to order and purchase the selected items. At this point, the communication link 22 could be established with the computer system 40, which may be local or remote, and the user's order information could be transmitted to the computer system 40 which in turn could process the order or further transmit the order as necessary.

In other embodiments, the indicated action of step 116 includes the computer system 40 and/or the sensor 12 responding to the measured information by providing feedback. The feedback could take any suitable form such as audio, visual or tactile feedback. In any event, once the indicated action has been performed in the step 116, the control of the method 100 is passed back to step 104 allowing the user to further explore the encoded physical medium 30 and select other regions for sensing.

As noted above with reference to FIG. 1, certain encoded physical mediums 30 include a document ID hot spot 33. In these embodiments, when a user first begins exploring the encoded physical medium 30 as described in step 104, the initial step 106 ought to be the engagement of the sensor 12 with the document ID hot spot 33. Then in steps 114–116, the sensor 12 could store the document ID for later use, or immediately transmit it to the computer system, or both; it depends upon the specific application. For example, it is contemplated that the sensor 12 store the document ID and include it with content decoded from each subsequently measured region prior to further processing of the decoded content.

Further, certain encoding schemes may not require the use of a marker. Within these schemes, steps 110 and 112 of FIG. 2 would become unnecessary, and thus another method for providing an interface using an encoding scheme without a marker could be implemented by simply skipping directly from step 108 to step 114 of FIG. 2.

Figure 3:
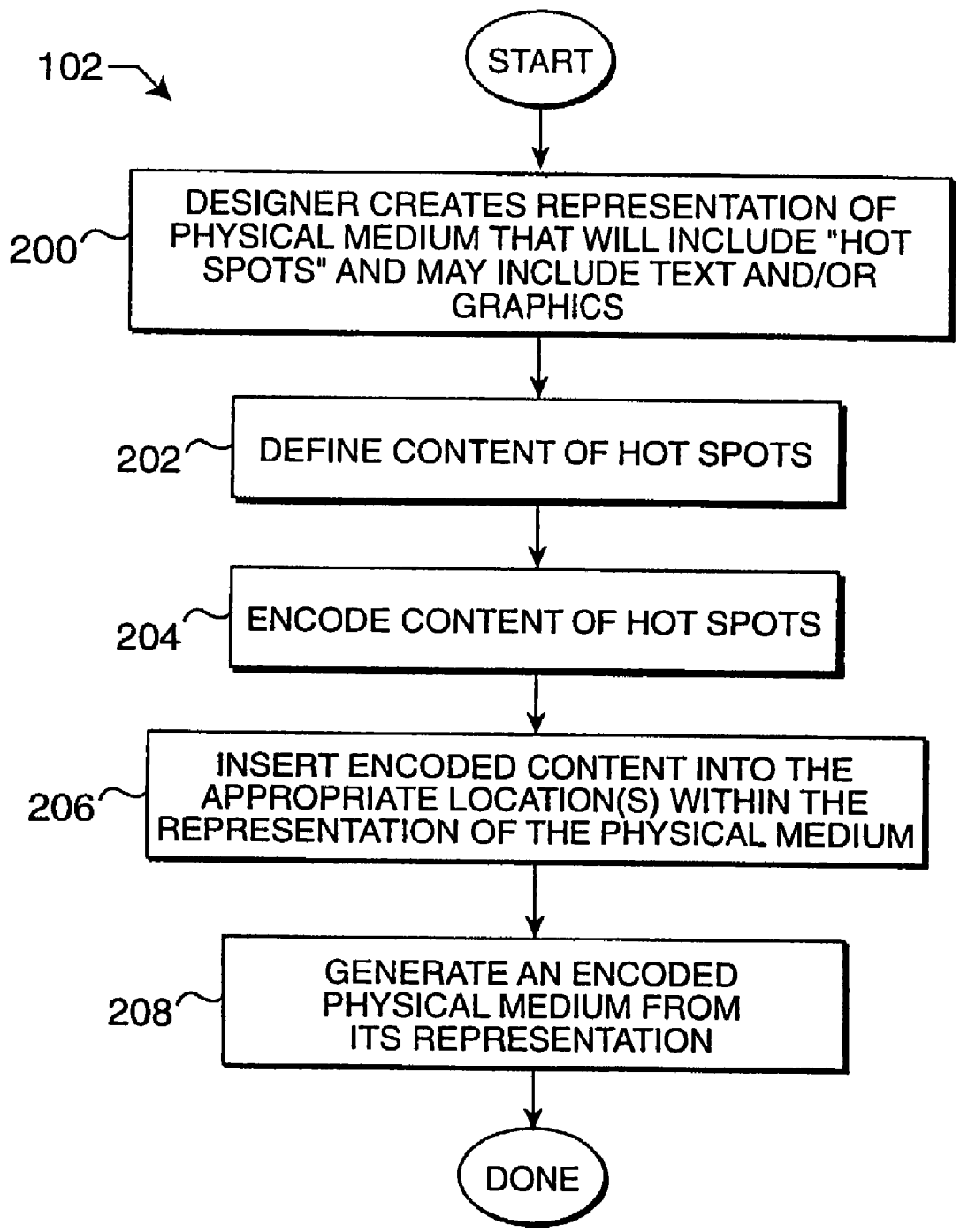
FIG. 3 is a flow chart illustrating one suitable method for providing a user an encoded physical medium in accordance with another aspect of the present invention.

Turning next to FIG. 3, a method 102 for providing a user an encoded physical medium 30 in accordance with another aspect of the present invention will be described. In a first step 200, the designer creates a representation of a physical medium 30 that will include hot spots. A "hot spot" is defined as a particular region wherein content is encoded, and may include text and/or graphics. The encoded content of the hot spot can take any of a variety of forms, dependent upon such things as the encoding scheme and the goals of the designer. For example, the encoding scheme may be such that the encoded content visually blends together with any text and graphics generated by the designer. Alternatively, the encoding scheme may result in the encoded content being visually distinctive or completely hidden from the viewer. The representation of the physical medium 30 may be created within an off-the-shelf or custom made design software system, or the representation may be a physical model. In a step 202, the designer defines the content of the hot spots. Alternatively, the designer may be provided with the content. The content of a hot spot is the information to be encoded therein, and may include computer instructions, a uniform resource locator (URL), and other data.

In a subsequent step 204, the content of each hot spot is encoded according to a particular encoding scheme. Preferably, the encoding will be automated such that the designer will simply enter the desired content and initiate the encoding process, which is in turn performed by a computer system or some other suitably programmed tool. In some embodiments, the encoding process will also introduce a marker into the encoded content indicating that certain information is encoded in the hot spots. Once the content is encoded, in a step 206 the encoded content is inserted into the appropriate locations within the representation of the physical medium 30. In a step 208, the encoded physical medium 30 is generated from its representation. For example, when the representation is created by a system such as graphic design software and the encoding scheme is a spectral encoding scheme, a printer utilizing the necessary inks can print out the encoded physical medium 30.

Figure 4:
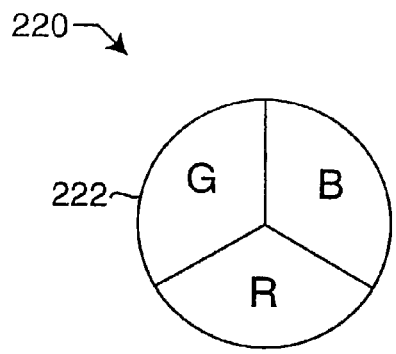
FIG. 4 is a diagrammatic illustration of a hot spot in accordance with one embodiment of the present invention.
Figure 5:
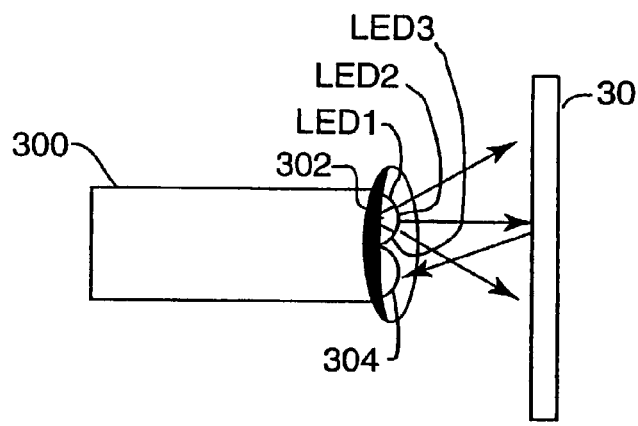
FIG. 5 illustrates a sensor responsive to a first spectral encoding scheme in accordance with yet another embodiment of the present invention.
Figure 6:
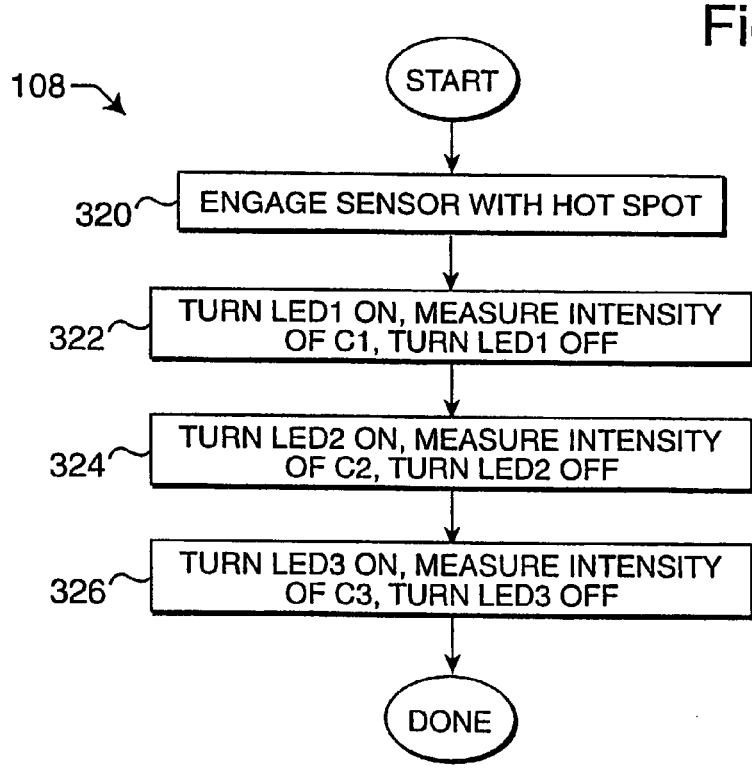
FIG. 6 is a flow chart illustrating one suitable method for measuring information encoded in a hot spot.

With reference to FIGS. 4–6, a first spectral encoding scheme according to another embodiment of the present invention will be described. The first spectral encoding scheme represents content via three different values encoded within a hot spot 220. The sensor "decodes" these values by measuring the intensities of three different encoding colors C1, C2, and C3 found within the hot spot 220. C1, C2, and C3 may, for example, correspond to red, green, and blue (RGB). Alternatively, C1, C2, and C3 may be selected from outside the visible light range (e.g., infrared colors) or may be a combination of visible and invisible colors.

As will be apparent to those skilled in the art, the hot spot 220 itself can be created using inks whose colors do not correspond directly to C1, C2, and C3. Take the instance where C1, C2, and C3 correspond to RGB.

Most likely, the color printing system selected to produce the hot spot 220 will be a "CMYK" type using cyan (C), magenta (M), yellow (Y), and black (K) inks to produce color images. In such a case, the encoded medium designer may be provided a mapping between CMYK space and the different content values, even though the sensor will be determining each content, value by measuring the intensities of the three different encoding colors RGB within the hot spot 220.

FIG. 4 represents diagrammatically a hot spot 220 encoded according to the first spectral encoding scheme. A pie chart 222 indicates that the different encoding colors C1, C2, and C3 are measurable in the hot spot 220, each taking on their own particular intensity. Thus the engaged sensor would measure three different values, one each for C1, C2, and C3. These values taken together provide the encoded content. FIG. 4 does not illustrate the visual appearance a hot spot would likely take on, but merely represents that the different encoding colors are measurable within the hot spot 220. Of course, depending upon the content encoded therein, each hot spot will have varying intensity levels and in some instances the intensity level of certain encoding colors would be zero. The actual visual appearance of the hot spot 220 would include any text and/or graphical illustrations that the designer has created.

FIG. 5 illustrates a sensor 300 responsive to the first spectral encoding scheme and thus operable to measure information from an encoded physical medium 30. The sensor 300 includes a light emitter 302, a sensing element 304, and a shroud 306. The light emitter 302 includes three light emitting diodes LED1, LED2, and LED3, each operable to emit light corresponding to C1, C2, and C3, respectively. The sensing element 304 is a broadband sensing element responsive to the entire light spectrum. A user engages the sensor 300 with a desired region 32 of the encoded physical medium 30 by turning the sensor 300 on and bringing the light emitter 302 and the sensing element 304 into reasonably close proximity to the desired region 32. When the sensor 300 is properly engaged with the desired region 32, the shroud 306 helps prevent the sensing element 304 from measuring extraneous information in the form of ambient light.

With reference to FIG. 6, one suitable method 108 for measuring the information stored within the desired region 32 will now be described. Simply put, the method 108 of FIG. 6 sequences through measuring the intensities of the encoding colors C1, C2, and C3. In a first step 320, the user engages the sensor 300 with the desired region 32. A step 322 turns LED1 on, measures the reflected intensity of C1, and then turns LED1 off. A step 324 turns LED2 on, measures the reflected intensity of C2, and then turns LED2 off. A step 326 turns LED3 on, measures the reflected intensity of C3, and then turns LED3 off. Typically the sensing element 304 will generate an analog voltage proportional to the light intensity and the sensor 300 will include an analog-to-digital (A/D) converter. Thus the number of content identification numbers available with the first encoding scheme is directly dependent upon the precision of the A/D converter.

Additional encoding schemes are described in Dougherty et al.'s copending U.S. patent application Ser. No. 08/946,327, entitled "Methods and Systems for Providing Human/Computer Interfaces," which is incorporated herein by reference in its entirety.

Figure 7:
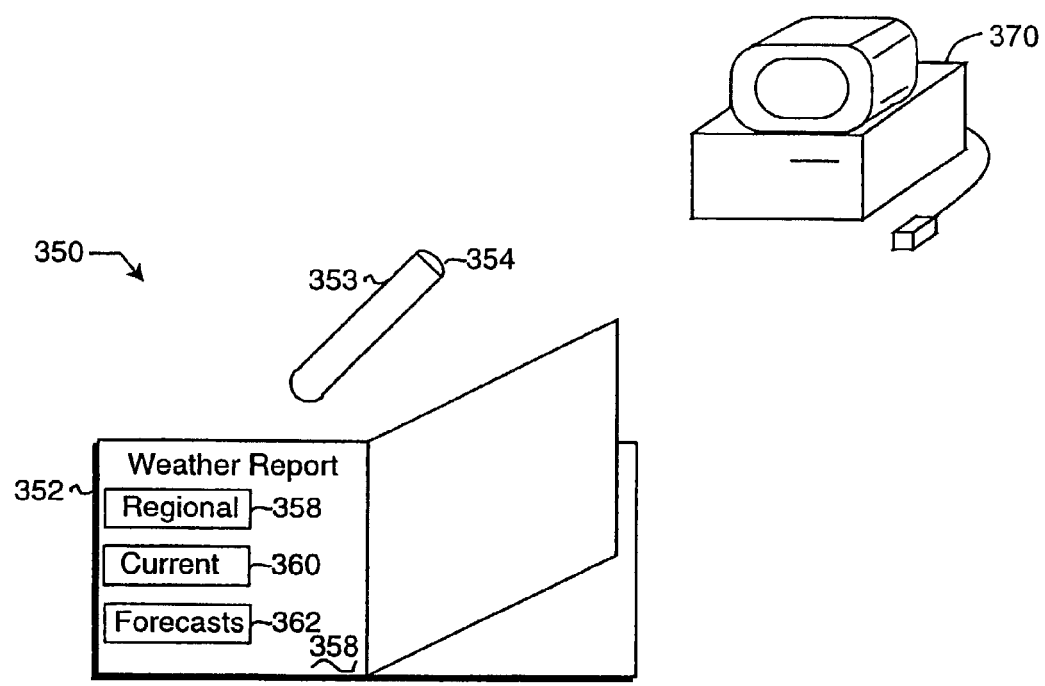
FIG. 7 is a diagrammatic illustration of a first data linked book embodiment of the present invention.

Turning next to FIG. 7, a data linked book 350 in accordance with one embodiment of the present invention will now be described. A primary purpose of the linked book 350 is to link a physical book with data such as video and audio streams available via an information network such as the Internet. The linked data is then presented (e.g., displayed, played, etc.) on an Internet device such as a WebTV or a personal computer.

The linked book 350 includes a physical book 352, a sensor 353 having an infrared transmitter 354, a plurality of pages such as page 356 and a plurality of hot spots such as hot spots 358, 360, and 362. The physical book 352 appears conventional to a viewer in that the book 352 flips open to the different pages, each of which provide meaningful information in the form of text and graphics. In the example of FIG. 7, the physical book 352 is opened to the page 356 entitled "Weather Report." Thus the user should immediately realize that the Weather Report page 356 is electronically linked to weather report information available over the corresponding information network. In the embodiment of FIG. 7, each of the hot spots represents a uniform resource locator (URL). As will be appreciated, a URL is the addressing mechanism used by the Internet to correspond to a unique Internet address. A URL, together with any other desired information, is encoded within each hot spot according to a selected encoding scheme such as a spectral encoding or bar code scheme.

When the user engages the sensor 353 with a desired hot spot, the sensor 353 decodes the content of the hot spot, performs any necessary interpretation and other local functions, and then transmits the URL to the computer system 370. The computer system 370 then uses the URL and other received information to download the desired data from the Internet, presenting such data to the user in the proper form. For example, a video stream may be displayed on the computer screen of the computer system 370.

Figure 8:
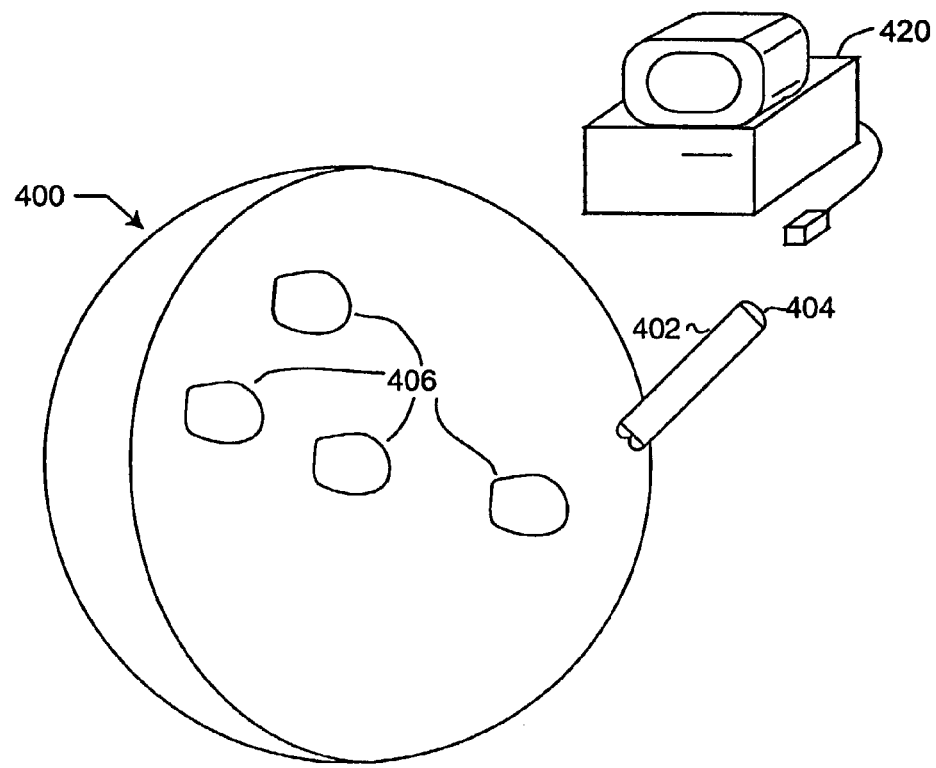
FIG. 8 is a diagrammatic illustration of a data linked globe embodiment of the present invention.

Turning next to FIG. 8, a data linked globe 400 in accordance with yet another embodiment of the present invention will now be described. The data linked globe 400 includes both a sensor 402 having an infrared transmitter 404 and a plurality of hot spots 406. The data linked globe 400 of FIG. 8 presents a spherical earth map. Encoded within the hot spots 406 are linking data. The linking data of FIG. 8 may take any of a variety of suitable forms. For example, similar to the data linked book of FIG. 8, the linking data may include a URL. Each hot spot may represent a town, region, province, country, etc. The associated URL may direct the computer system 420 to an Internet World Wide Web page produced, e.g., by the Chamber of Commerce for that town, region, etc.

In an alternative embodiment, the computer system 420 of FIG. 8 maintains a database of geographical and/or historical data regarding the region represented by the hot spot. The linking data would then instruct the computer system 420 to present the corresponding information through the appropriate media interface, e.g., audio and video. In yet another embodiment, the linking data stored in each hot spot would contain the bulk of the content, the sensor 402 simply transferring this content to the computer system 420 which would in turn present this information through the appropriate media interface.

As will be appreciated, any encoding scheme (including those described above) will have some practical upper limit on the quantity of data that may be encoded upon a physical medium. Accordingly, certain computer interface applications may require more data storage capability than is reasonably possible from known encoding schemes. For example, only a fraction of the available URLs could be encoded utilizing a standard bar code scheme. However, it would be exceedingly useful to implement a computer interface such as the data-linked book 350 described above yet somehow get beyond the limitation imposed by the selected encoding scheme.

To address this problem, certain embodiments of the present invention teach encoding an indirection in a hot spot rather than encoding the actual content or the direct address of the actual content in the hot spot. As will be appreciated, an indirection is an address that designates the storage location of an item of data to be treated as the address of an operand, but not necessarily as its direct address. By way of example, reconsider FIG. 8. The content encoded within a hot spot 406 on the data linked globe 400 may be an address of a given word processing document stored on the computer system 420. Engaging the sensor 402 with the hot spot 406 would then result in starting up the appropriate word processor with the given word processing document. More generally, the content encoded within the hot spot 406 can be the address of a computer document stored on the computer system 420. The computer document could take any suitable form such as a graphics file, an audio file, a video file, or a word processing document. Then, engaging the sensor 402 with the hot spot 406 would invoke a suitable application for utilizing or accessing the computer document. Additionally, the suitable application may execute directly on the computer system 420, or remotely across a computer network coupled with the computer system. As will be appreciated, encoding an indirection within the hot spots greatly expands the amount of data which can be accessed using the present invention.

Figure 9:
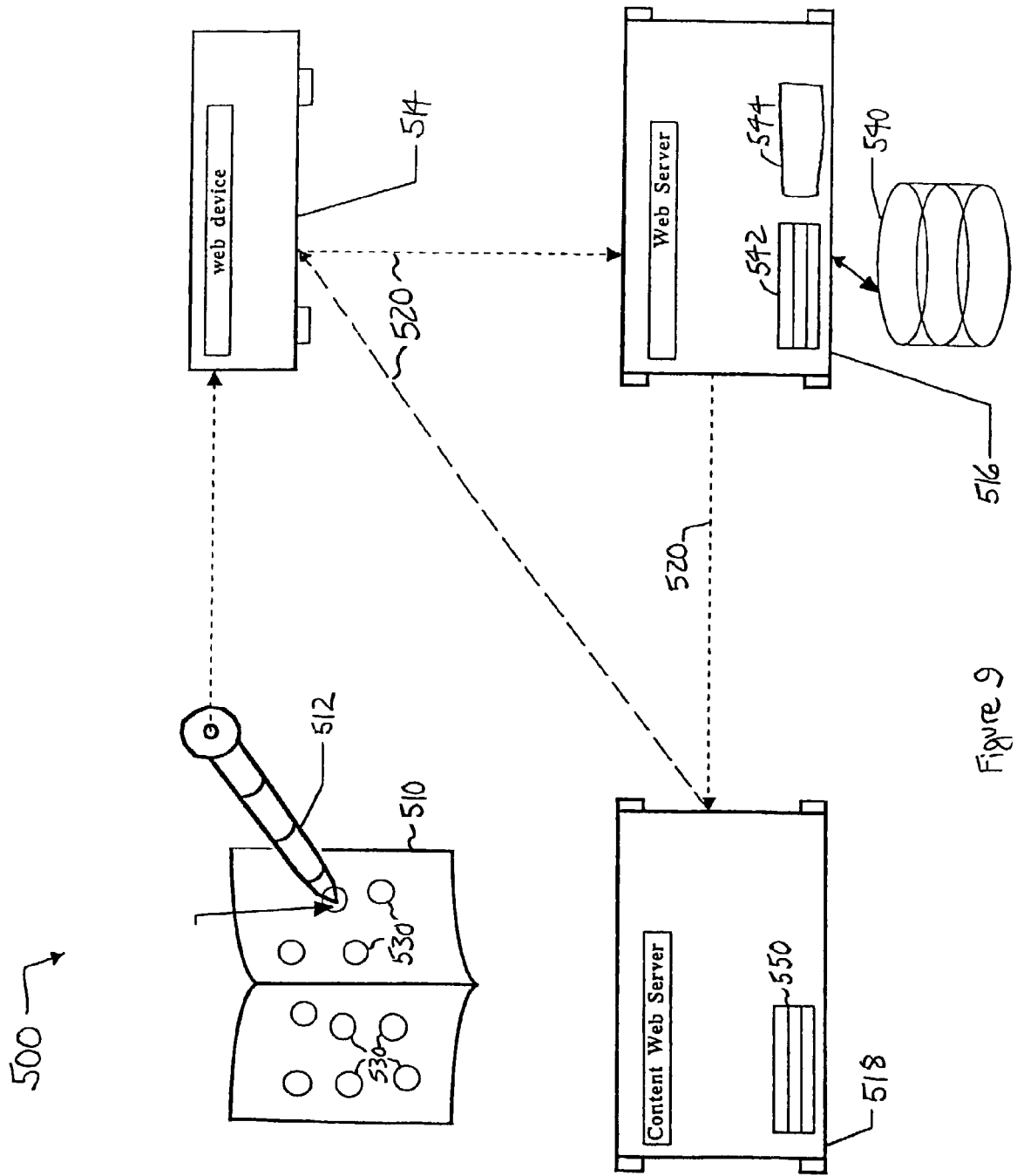
FIG. 9 is a diagrammatic illustration of an interface system for linking an encoded hotspot storing a URL ID with a corresponding URL.

Turning next to FIG. 9, an interface system 500 for linking a hotspot identification (ID) to a particular URL in accordance with yet another embodiment of the present invention will be described. The interface system 500 enables greater capability by storing at a linking web server hotspot IDs mapped to corresponding URLs. Thus, each hotspot need only have a URL ID encoded therein, and the routing web service can link each request to the proper content web server. This enables a hotspot to indirect to a URL (or any other resource address) than cannot suitably be stored by the particular encoding scheme, yet can be suitably identified by a URL ID.

To accomplish this, the interface system 500 includes an encoded physical medium 510, a wand sensor 512, a web device 514, a routing web server 516, at least one other web server such as a content web server 518, and a computer network 520 such as the Internet. The encoded physical medium 510 includes a plurality of hotspots 530. Each hotspot 530 has certain information encoded therein including a particular URL ID. The sensor 512 is operable to decode the certain information present in each hotspot 530 and transmit the decoded certain information to the web device 514. The web device 514 in turn is operable to forward the particular URL ID to the routing web server 516 of the computer network 520. The location or URL of the routing web server 516 may be encoded in the hotspot 530, added into the decoded certain information by the wand sensor 512 prior to transmission to the web device, or provided by the web device 514. As will be appreciated, the web device 514 may be any suitable mechanism such as a set-top web device, a personal computer, etc.

The routing web server 516 includes a computer readable medium 540 wherein the routing web server 516 maintains a web page database 542 and a service access log 544. The web page database 542 provides a correspondence between the various URL IDs and the "real" content web pages such as content web pages 550 found on the content web server 518. Within the service access log 544 the routing web server 516 logs every wand sensor access. The information in the service access log 544 can be utilized for billing, developing customer data, etc.

Figure 10:
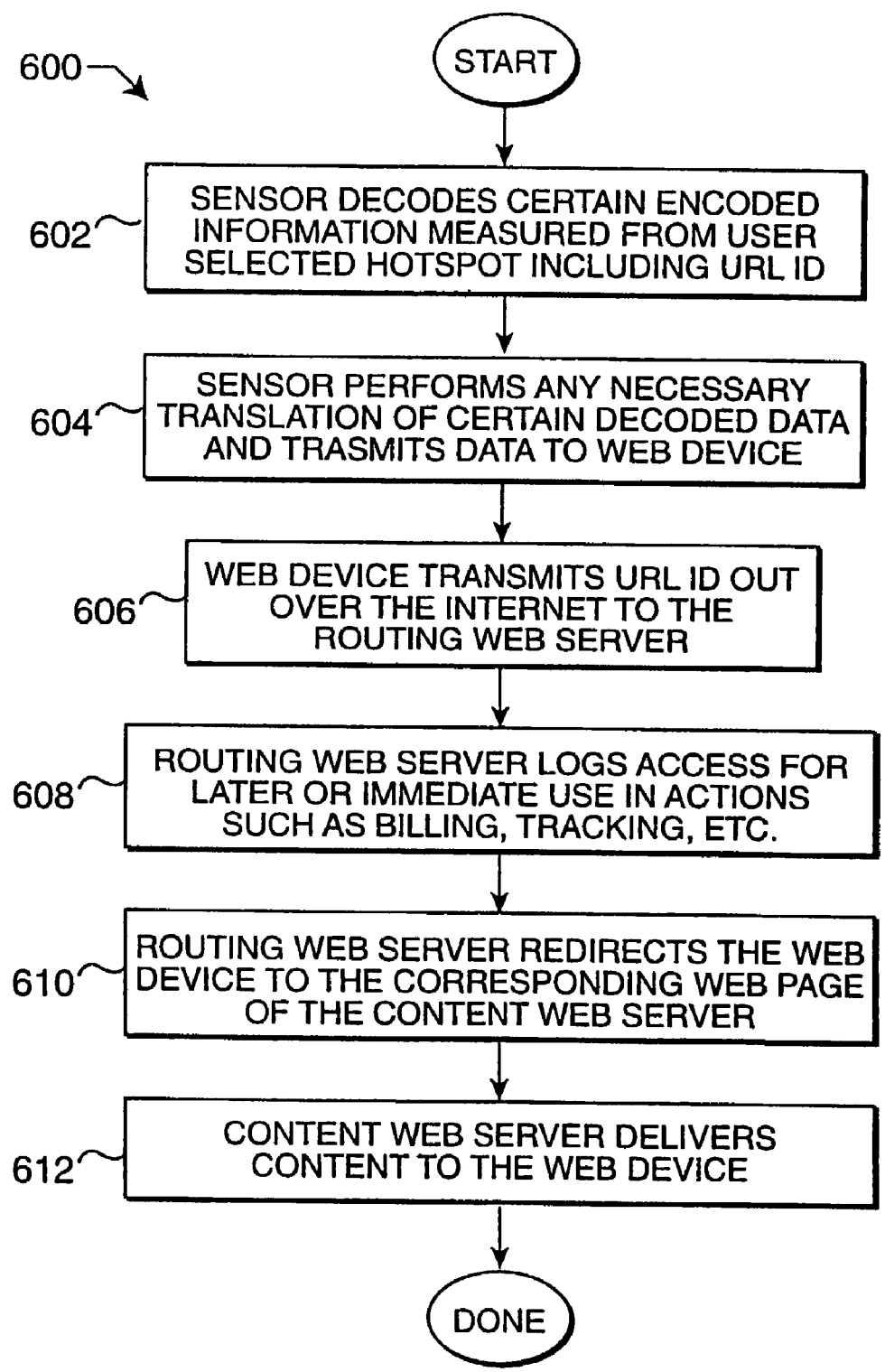
FIG. 10 is a flowchart illustrating a method for providing user content indicated by a URL ID from a corresponding URL.

With reference to FIG. 10, a method 600 for linking the user with the proper URL will now be described. In an initial step 602, the wand sensor 512 decodes the certain encoded information measured from a selected hotspot 530. In a next step 604, the wand sensor 604 performs any translation of the certain decoded data necessary and transmits the translated data to the web device 514. The translation may involve, e.g., attaching the URL of the routing web server 516 to a decoded URL ID and marshaling the certain decoded data into a format suitable for transmission.

Once the web device 514 receives the URL ID, in a step 606 the web device 514 transmits the URL ID over the Internet to the routing web server 516. The transmission step 606 is essentially a request for content. Upon receipt of the URL ID, in a step 608 the routing web server 516 logs the access within the service access log 544 for later or immediate use in performing billing, tracking, etc. Then in a step 610, the routing web server 516 utilizes the web page database 542 to redirect the web device's content request to the corresponding web page provided by the content web server 518. In response, in a step 612, the content web server 518 provides the indicated content to the web device 514. The indicated content may be provided to the web device 514 directly over the Internet, or may be redirected through the routing web server 516 for additional tracking, etc.

As will be appreciated, the interface system 500 of FIG. 9 is not limited to the particular Internet application described above. For example, those skilled in the art will understand that the principles described above are well suited for use in providing content over a variety of different network formats; particularly they are not limited to web pages and the Internet. Hence, in more general terms, it is contemplated that the interface system 500 has a network device (instead of a web device), a routing server (instead of a routing web server), and a content server (instead of a content web server). Additionally, the interface system 500 may be designed such that the web device 514 has the databases necessary for interpreting content requests and directly forwarding them to the content server. In such an embodiment, the routing server would not be necessary.

While this invention has been described in terms of several preferred embodiments and a number of specific examples, there are alterations, permutations, and equivalents which fall within the scope of this invention.

As will be appreciated, the variety of physical medium upon which content may be encoded according to the present invention is almost limitless, ranging from toys to tools to industrial parts and beyond. Still further, the hot spots may be encoded regions displayed upon a computer monitor, television screen, or the like.

Likewise, the nature of content that may be encoded in the hot spots is unconstrained. The content may be abstract or concrete. A concrete example arises in the case of industrial parts where the encoding could be both machine and human readable and geared towards assisting in an automated training system. Under the training system, the worker checks the code on the part to determine the correct assembly order or obtain other information about the part. Thus, with training, the worker would need to use the sensor only when she encounters a code that she is unfamiliar with.

In certain applications, the nature of the content encoded within different hotspots varies. For example, a particular encoded physical medium may have a plurality of different types of hotspots such as indirection hotspots, direct content hotspots, and a document ID hotspot. Indirection hotspots have indirections encoded therein and thus once decoded, a mapping from the indirection to the desired content must be performed. Direct content hotspots are encoded with either direct addresses of the desired content or the desired content itself. The document ID hotspot provides an indication of the identity of the encoded physical medium.

It is further contemplated that the sensor may take many different forms. For example, rather than a wand or portable sensing device, the sensor may be a stationary device where the encoded object is passed under or near the stationary sensor in order to cause engagement.

Therefore it is desired that the appended claims be interpreted as including all such alterations, permutations, and equivalents as fall within the true spirit and scope of the present invention.

What is claimed is:

1. An interface system for providing interaction between a user and a computer system comprising:
   a sensor configured to:
     read and interpret a content hotspot;
     read and interpret a context hotspot; and
   a processor configured to perform a first operation based on a content information interpreted from the content hotspot in the event a first context information is or has been interpreted from the context hotspot and a second operation based on the content information interpreted from the content hotspot, which second operation is different from the first operation in at least one respect, in the event a second context information is or has been interpreted from the context hotspot;
wherein the content hotspot and context hotspot are separately readable by the sensor.

2. An interface system for providing interaction between a user and a computer system as recited in claim 1 wherein the processor is located on the sensor.

3. An interface system for providing interaction between a user and a computer system as recited in claim 1 wherein the processor is located on the computer system.

4. An interface system for providing interaction between a user and a computer system as recited in claim 1 further comprising a database accessible to the processor;
wherein the operation performed by the processor comprises locating an entry in the database.

5. An interface system for providing interaction between a user and a computer system as recited in claim 1 wherein:
the content information is an indirection that designates a location for an operand; and
the processor performs the operation using the operand.

6. An interface system for providing interaction between a user and a computer system as recited in claim 1 wherein:
the context information is an indirection that designates a location for an operand; and
the processor performs the operation using the operand.

7. An interface system for providing interaction between a user and a computer system as recited in claim 1 further comprising a marker that indicates the presence of the content hotspot.

8. An interface system for providing interaction between a user and a computer system as recited in claim 1 further comprising a marker that indicates the presence of the context hotspot.

9. An interface system for providing interaction between a user and a computer system as recited in claim 1 wherein:
the sensor comprises a memory; and
the content information is stored in the memory.

10. An interface system for providing interaction between a user and a computer system as recited in claim 1 wherein:
the sensor comprises a memory; and
the context information is stored in the memory.

11. An interface system for providing interaction between a user and a computer system as recited in claim 1 wherein:
the context hotspot is encoded on a physical medium; and
the context hotspot comprises a document identification that provides an indication of an identity of the physical medium.

12. A method of providing interaction between a user and a computer system comprising:
reading and interpreting a content hotspot;
reading and interpreting a context hotspot; and
performing a first operation based on a content information interpreted from the content hotspot in the event a first context information is or has been interpreted from the context hotspot and a second operation based on the content information interpreted from the content hotspot, which second operation is different from the first operation in at least one respect, in the event a second context information is or has been interpreted from the context hotspot
wherein the content hotspot and context hotspot are separately readable.

13. A method of providing interaction between a user and a computer system as recited in claim 12 wherein the operation comprises locating an entry in a database.

14. A method of providing interaction between a user and a computer system as recited in claim 12 wherein the content information is an indirection that designates a location for an operand; and wherein the operation performed uses the operand.

15. A method of providing interaction between a user and a computer system as recited in claim 12 wherein the context information is an indirection that designates a location for an operand; and wherein the operation performed uses the operand.

16. A method of providing interaction between a user and a computer system as recited in claim 12 further comprising indicating the presence of the content hotspot.

17. A method of providing interaction between a user and a computer system as recited in claim 12 further comprising indicating the presence of the context hotspot.

18. A method of providing interaction between a user and a computer system as recited in claim 12 further comprising storing the content information in a memory.

19. A method of providing interaction between a user and a computer system as recited in claim 12 further comprising storing the context information in a memory.

20. A method of providing interaction between a user and a computer system as recited in claim 12 wherein:
the context hotspot is encoded on a physical medium; and
the context hotspot comprises a document identification that provides an indication of an identity of the physical medium.

\* \* \* \* \*

UNITED STATES PATENT AND TRADEMARK OFFICE
CERTIFICATE OF CORRECTION

PATENT NO. : 7,177,954 B1  Page 1 of 1
APPLICATION NO. : 10/177737
DATED : February 13, 2007
INVENTOR(S) : van Allen et al.

It is certified that error appears in the above-identified patent and that said Letters Patent is hereby corrected as shown below:

On the face page, in field (75), in "Inventors", in column 1, line 1, delete "Santa Monica," and insert -- San Francisco, --, therefor.

In column 1, line 7, after "1998," insert -- now U.S. Pat. No. 6,411,994 --.

In column 1, line 9, after "60/061,310," delete "now U.S. Pat. No. 6,411,994".

In column 1, line 10, after "reference" insert -- . --.

In column 4, line 42, delete "ID," and insert -- ID --, therefor.

In column 8, lines 38–46, delete "Most likely, the color printing system selected to produce the hot spot 220 will be a "CMYK" type using cyan (C), magenta (M), yellow (Y), and black (K) inks to produce color images. In such a case, the encoded medium designer may be provided a mapping between CMYK space and the different content values, even though the sensor will be determining each content, value by measuring the intensities of the three different encoding colors RGB within the hot spot 220." and insert the same on Col. 8, Line 37, after "RGB." as a continuation of the same Paragraph.

In column 8, line 44, delete "content," and insert -- content --, therefor.

Signed and Sealed this

Twenty-fourth Day of June, 2008

JON W. DUDAS
*Director of the United States Patent and Trademark Office*